(12) United States Patent
Ertugrul

(10) Patent No.: US 10,799,320 B2
(45) Date of Patent: Oct. 13, 2020

(54) HANDPIECE HEAD FOR A DENTAL HANDPIECE

(71) Applicant: DENTSPLY SIRONA Inc., York, PA (US)

(72) Inventor: Metin Ertugrul, Rodermark (DE)

(73) Assignee: Dentsply Sirona Inc., York, PA (US)

( * ) Notice: Subject to any disclaimer, the term of this patent is extended or adjusted under 35 U.S.C. 154(b) by 0 days.

(21) Appl. No.: 15/710,860

(22) Filed: Sep. 21, 2017

(65) Prior Publication Data

US 2018/0085191 A1    Mar. 29, 2018

(30) Foreign Application Priority Data

Sep. 22, 2016   (DE) .................. 10 2016 218 273

(51) Int. Cl.
*A61C 1/16* (2006.01)
*B65D 39/08* (2006.01)
*A61C 1/12* (2006.01)

(52) U.S. Cl.
CPC .................. *A61C 1/16* (2013.01); *A61C 1/12* (2013.01); *B65D 39/08* (2013.01)

(58) Field of Classification Search
CPC .. A61C 1/16; A61C 1/12; B65D 39/08; B65D 1/0246; B65D 51/18
USPC ......................................................... 433/147
See application file for complete search history.

(56) References Cited

U.S. PATENT DOCUMENTS

| | | | |
|---|---|---|---|
| 3,653,185 A | 4/1972 | Scott et al. | |
| 6,223,946 B1* | 5/2001 | Geisinger | B65D 39/08 222/111 |
| 8,584,877 B2* | 11/2013 | Heiberger | B65D 47/242 215/252 |
| 2007/0087305 A1* | 4/2007 | Schatz | A61C 1/08 433/126 |
| 2008/0118890 A1* | 5/2008 | Knopp | A61C 1/0015 433/104 |
| 2008/0216258 A1* | 9/2008 | Kressner | A61C 17/22 15/22.1 |
| 2011/0114595 A1* | 5/2011 | Heiberger | B65D 47/06 215/329 |
| 2011/0129798 A1* | 6/2011 | Zucker | A61C 8/005 433/173 |

(Continued)

FOREIGN PATENT DOCUMENTS

| | | |
|---|---|---|
| DE | 1950532 U | 6/1970 |
| DE | 8309396 U1 | 1/1984 |

(Continued)

*Primary Examiner* — Matthew M Nelson
(74) *Attorney, Agent, or Firm* — Dentsply Sirona Inc.

(57) ABSTRACT

The invention relates to a handpiece head (1) comprising a housing (2) and a closing cap (3), wherein the housing (2) is releasably connected to the closing cap (3) by means of a screw connection (4). The closing cap (3) comprises at least one recess (8) or at least one elevation (7), wherein the housing (2) correspondingly comprises at least one elevation (7) or at least one recess (8). When the closing cap (3) is screwed in, the elevation (7) on the housing (2) engages in the corresponding recess (8) on the closing cap (3) or the elevation (7) on the closing cap (3) engages in the corresponding recess (8) on the housing (2), so that an inadvertent release of the closing cap from the housing (2) as a result of vibrations of the handpiece head (1) is prevented by the engagement.

12 Claims, 2 Drawing Sheets

(56) References Cited

U.S. PATENT DOCUMENTS

2012/0277684 A1* 11/2012 Cronenberg ............ B65B 63/08
                                                        604/189
2015/0150761 A1*  6/2015 Lanternari .............. A47J 36/24
                                                        426/115
2017/0201232 A1    7/2017 Nakamura et al.
2018/0311427 A1* 11/2018 Duhamel .............. A61M 1/122
2018/0312308 A1* 11/2018 Hein ................. B65D 43/0212

FOREIGN PATENT DOCUMENTS

EP           1774923  A1    4/2007
JP         201352906  A    11/2015

* cited by examiner

HANDPIECE HEAD FOR A DENTAL HANDPIECE

TECHNICAL FIELD

The invention relates to a handpiece head comprising a housing and a closing cap, wherein the housing is releasably connected to the closing cap by means of a screw connection.

STATE OF THE ART

A number of closing caps for dental handpieces are known from the prior art.

The fastening of the closing cap can be performed, for example, by screwing it in with a strictly defined torque.

This has the disadvantage, however, that the closing cap can be loosened again by vibrations.

In another option, the closing cap is glued to the housing after being screwed in. This has the disadvantage, however, that the glued connection can be loosened again by vibrations.

Another option provides a bore that passes through the closing cap and the housing, so that, after the closing cap is screwed in, fastening takes place by screwing a screw into the bore or inserting a pin into the bore. This, however, has the disadvantage that the screw or the pin can be loosened again by vibrations.

In another option, a plastic body, which causes a higher torque when the closing cap is screwed in, is attached to the external thread of the closing cap or to the internal thread of the housing.

This, however, has the disadvantage that the plastic body can lose its dimensional stability as a result of repeatedly being screwed in and as a result of steam sterilization.

EP 1774923A1 discloses a closing cap for a housing of a dental handpiece, wherein a spring element is used for fastening the closing cap. The spring element is pressed against the inner wall of the housing when the cap is being screwed in, thus creating a frictional connection. One disadvantage of this is that a frictional connection is a force-fitted connection and can be loosened again by vibrations.

The task of the present invention is therefore to provide a closing cap for a dental handpiece, which cannot release completely from the handpiece as a result of vibrations of the handpiece.

PRESENTATION OF THE INVENTION

The invention relates to a handpiece head comprising a housing and a closing cap, wherein the housing is releasably connected to the closing cap by means of a screw connection. The handpiece head comprises a snap-fit connection, wherein the snap-fit connection engages when the closing cap is screwed in.

One advantage of such a handpiece head is that the engagement of the closing cap with the housing prevents an inadvertent release of the closing cap from the housing as a result of vibrations of the handpiece head.

Another advantage of the handpiece head is that no additional component, such as a spring element, is required for fastening the closing cap. This is due to the fact that the recesses and the elevations are part of the closing cap or the housing.

The closing cap and the housing can be made of a plastic.

The closing cap can be screwed into the housing, wherein the closing cap can comprise an external thread and the inner wall of the housing can comprise an internal thread.

The closing cap can alternatively be screwed onto the housing, wherein the closing cap comprises an internal thread and the housing comprises an external thread on the outer surface.

A snap-fit connection consisting of at least one elevation and one corresponding recess is therefore used for the engagement.

The at least one recess can be disposed on the closing cap or on the housing. The corresponding recess is disposed in such a way that, in the screwed-in state, the elevation engages in the recess.

The elevation and the corresponding recess can be shaped in any way desired. The elevation can have a rectangular shape, for example, or comprise an angled edge. When screwing in, therefore, the closing cap or the housing is elastically deformed until the elevation engages in the recess and the closing cap or the housing return to the original state prior to elastic deformation.

The closing cap can advantageously comprise at least one recess, while the housing can correspondingly comprise at least one elevation, whereby, when the closing cap is screwed in, the elevation on the housing engages in the corresponding recess on the closing cap. The snap-fit connection is consequently formed by the elevation and the recess.

If the closing cap is screwed into the housing, an outer surface of the closing cap can advantageously comprise at least one recess, while an inner surface of the housing comprises at least one elevation, whereby, when the closing cap is screwed in, the elevation on the housing engages in the corresponding recess on the closing cap.

As a result, the elevation on the housing engages in the recess on the closing cap.

If the closing cap is screwed onto the housing, an inner surface of the closing cap can advantageously comprise at least one elevation, while an outer surface of the housing correspondingly comprises at least one recess, whereby, when the closing cap is screwed in, the elevation on the closing cap engages in the corresponding recess on the housing.

In this alternative embodiment, the closing cap is screwed onto the housing, so that the elevation on the closing cap engages in the corresponding recess on the housing.

In a sectional view through a rotational axis of the closing cap and the housing, the elevation and the corresponding recess can advantageously have a rectangular shape.

This ensures a stable snap-fit connection.

The elevation can advantageously comprise a first chamfer at an upper corner and/or a second chamfer at a lower corner.

The chamfer at the upper corner of the elevation facilitates the elastic deformation of the closing cap or the housing. This is due to the fact that, as a result of the angled chamfer, the force produced when the closing cap is screwed in is converted into a greater radial force for elastic deformation.

The recess on a lower corner can advantageously comprise a chamfer.

The chamfer on the lower corner of the recess facilitates the release of the snap-fit connection. This is due to the fact that, as a result of the chamfer on the lower corner, the force when the closing cap is screwed on is converted into a greater radial force for elastic deformation.

Advantageously, there can be play between the elevation and the recess in the engaged state.

Potential manufacturing defects are offset by the play that exists between the elevation and the recess in the engaged state.

In a sectional view through a rotational axis of the closing cap and the housing, in the engaged state the elevation and the corresponding recess can advantageously comprise a first edge and a second edge, wherein the first edge of the elevation and the first edge of the corresponding recess is disposed at an angle relative to the rotational axis of the housing and the closing cap, and comprises an angle between 15° and 60°, wherein, in the engaged state of the handpiece head, there is a distance between the second edge of the elevation and the second edge of the corresponding recess.

In this embodiment, the first edge of the elevation and the corresponding recess are disposed at an angle, so that, when the closing cap is screwed on, the first edge of the elevation slides along the first edge of the recess, thus creating elastic deformation.

The torque required to screw on the closing cap can thus be defined by the angle of the first edge.

The length of the first edge can advantageously be shorter than the length of the second edge.

Because the first edge is longer, the angle can be selected to be smaller; as a result the rotational element needed to screw on the closing cap is smaller.

The length of the second edge can advantageously be less than 30% of the length of the first edge.

The recess can advantageously be formed as an annular uninterrupted groove on a cylindrical outer surface of the closing cap or on a cylindrical inner surface of the housing.

The configuration of a recess as an annular groove ensures a particularly stable snap-fit connection. An annular elevation without interruptions significantly increases the torque required for elastic deformation. This results in a more stable snap-fit connection.

The elevation can advantageously be formed as an uninterrupted annular elevation on a cylindrical outer surface of the closing cap or on a cylindrical inner surface of the housing.

This likewise results in a more stable snap-fit connection.

The at least one elevation can advantageously be designed as a ring of a plurality of interrupted elevations, which are disposed on the closing cap or on the housing.

The housing and/or the closing cap can advantageously be elastically deformed when being screwed together and return to their original shape when they engage, whereby a difference between a first distance of an edge of the elevation to a corresponding edge of the recess in an elastically deformed state and a second distance of the edge of the elevation to the corresponding edge of the recess in a relaxed original state is a fixed value.

The difference between the distance in the elastically deformed state and the distance in the relaxed state is a measure of the elastic deformation. The bigger the difference, the greater the elastic deformation and with it the torque required to screw on the closing cap.

The value of the difference can advantageously be between 3 μm and 10 μm.

This value for the difference is particularly advantageous, because it achieves the desired torque.

The housing and/or the closing cap can advantageously comprise openings to facilitate the elastic deformation that occurs when said housing and closing cap are screwed together.

The openings facilitate the elastic deformation and, as a result, the torque required to screw on the closing cap is reduced.

The closing cap and the housing can be made of a suitable material, such as stainless steel or a titanium alloy.

The snap-fit connection is designed in such a way that, due to the elastic deformation, a specific torque has to be overcome when the housing and the closing cap are screwed together, so that the closing cap cannot inadvertently unscrew itself as a result of vibrations. The torque when screwing in the closing cap can, for example, be greater than 20 Ncm.

In the engaged state, the openings can advantageously be disposed parallel to the rotational axis of the housing and the closing cap.

One respective elevation or one recess can advantageously be disposed between the adjacent openings.

The openings can be disposed either on the closing cap or on the housing.

BRIEF DESCRIPTION OF THE DRAWINGS

The invention is explained with reference to the drawings. The drawings show.

DESIGN EXAMPLES

Figure 1:
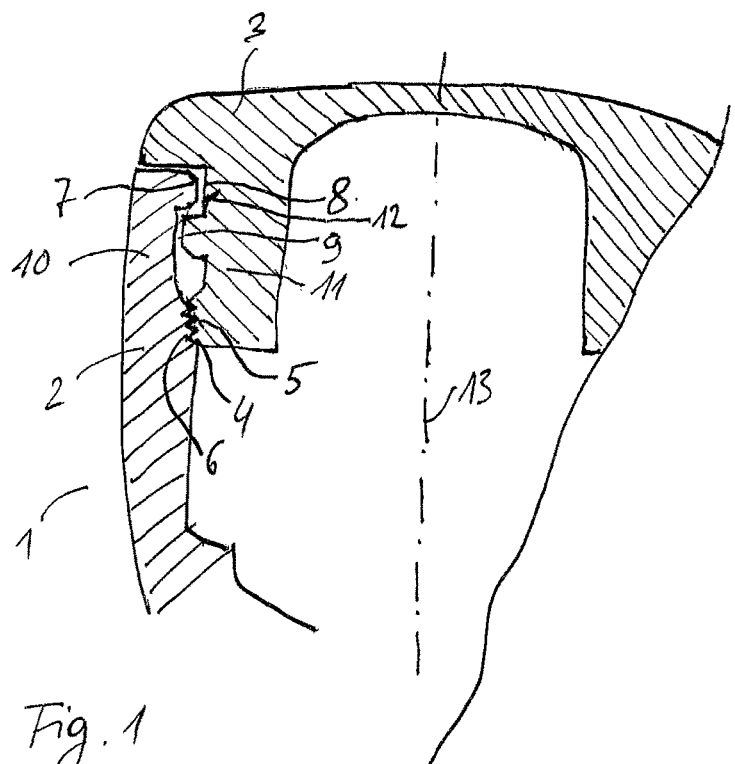
FIG. 1 a sketch of a handpiece head,
FIG. 2 a sketch of a rectangular elevation,
FIG. 3 a sketch of an elevation with an angled edge,
FIG. 4 a sketch of an elevation with a longer angled edge,
FIG. 5 a sketch of an alternative embodiment of the handpiece head.

FIG. 1 shows a handpiece head 1 comprising a housing 2 and a closing cap 3, wherein the housing is releasably connected to the closing cap by means of a screw connection 4. The outer side of the closing cap 3 comprises an external thread 5 that it is screwed with an internal thread 6 on the housing 2. The housing comprises an elevation 7 which engages in a corresponding recess 8 on the closing cap 3.

When the closing cap 3 is screwed into the housing 2, the elevation 7 is pushed over a projection 9, so that a region 10 of the housing 2 and/or a region 11 of the closing cap 3 are elastically deformed.

FIG. 1 shows the closing cap 3 and the housing 2 in the engaged state after being screwed together. An inadvertent release of the closing cap 3 from the housing 2 as a result of possible vibrations of the handpiece head is prevented by the engagement. In the present case, the elevation 7 and the corresponding recess 8 have a rectangular design. In the present case, in the engaged state, a first edge 12 of the recess 8 is disposed parallel to a rotational axis 13 of the closing cap 3 and the housing 2.

Figures 2, 3, 4:
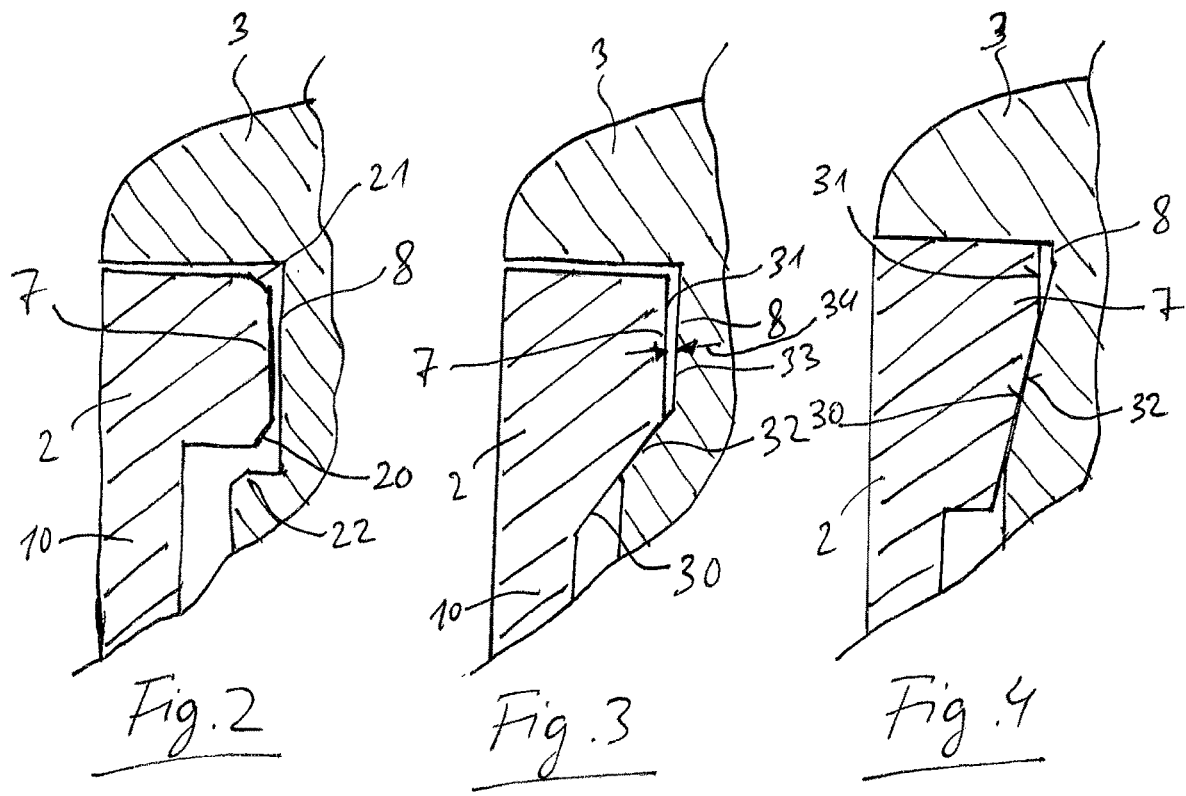

FIG. 2 shows another embodiment of the elevation 7 with a corresponding recess 8, wherein the elevation 7 comprises a first chamfer 20 on a lower corner and a second chamfer 22 on an upper corner of the elevation 7. The recess 8 correspondingly comprises a chamfer 22 on a lower corner. When the closing cap 3 is screwed into the housing 2, the region 10 of the housing is elastically deformed. Until the elevation 7 engages in the recess 8 and the region 10 of the housing 2 returns to the original state.

FIG. 3 shows another embodiment, wherein the elevation 7 comprises a first edge 30 and a second edge 31. The first edge 30 comprises an angle of 35° relative to the rotational axis 13 of FIG. 1. As a result, the unscrewing of the closing cap 3 from the housing 2 is facilitated. This is due to the fact that, as a result of the angled disposition of the first edge 30, the force produced by screwing on the closing cap 3 is converted into a radially acting force for the elastic deformation of the region 10 of the housing 2. The recess 8 correspondingly comprises a first edge 32 and a second edge 33, wherein the first edge 32 likewise comprises an angle of 35° relative to the rotational axis 13. In the engaged state, there is approximately 50 μm of play 34 between the second edge 31 of the elevation 7 and the second edge 33 of the recess 8.

FIG. 4 shows another embodiment, wherein the first edge 30 of the elevation 7 comprises an angle of 15° relative to the rotational axis 13. The first edge 30 is significantly longer than the second edge 31. The first edge 32 of the corresponding recess 8 likewise comprises an angle of 15° relative to the rotational axis 13.

Figure 5:
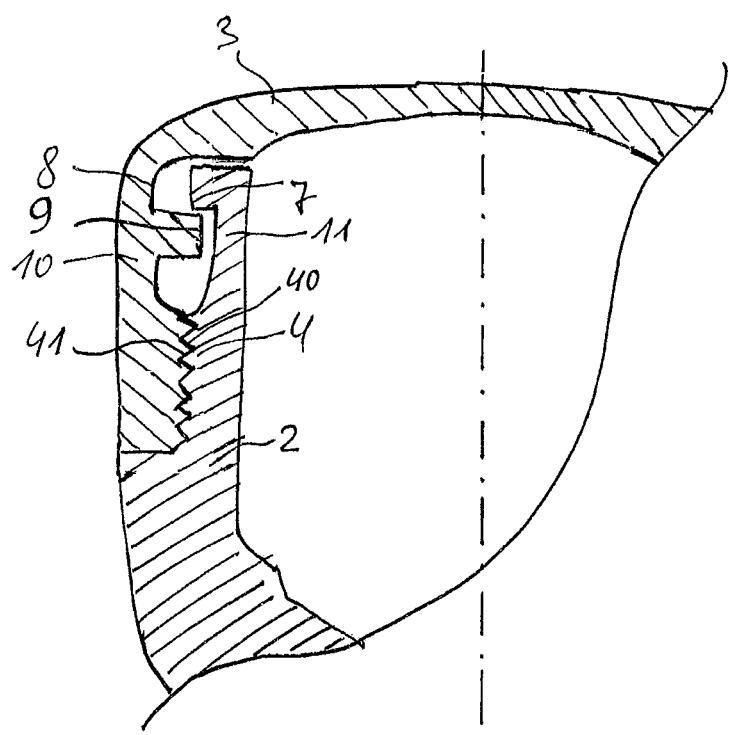

FIG. 5 shows another embodiment, wherein the closing cap 3 is screwed onto the housing 2. An outer side of the housing 2 comprises an elevation 7, whereas an inner side of the closing cap 3 comprises a corresponding recess 8 The screw connection 4 consists of an external thread 40 on the housing 2 and an internal thread 41 on the closing cap 3. When the closing cap 3 is screwed onto the housing 2, a region 10 of the closing cap and a region 11 of the housing 2 are elastically deformed until the elevation 7 engages in the corresponding recess 8. When the closing cap 3 is screwed into the housing 2, the elevation 7 is pushed over a projection 9 until the elevation 7 engages in the recess 8.

The invention claimed is:

1. Handpiece head comprising:
a housing and a closing cap
wherein the housing is releasably connected to the closing cap by means of a screw connection,
wherein the handpiece head comprises a snap-fit connection,
wherein the snap-fit connection engages when the closing cap is screwed in,
wherein the closing cap comprises at least one recess and the housing correspondingly comprises at least one elevation, wherein the at least one recess has a base edge and two side edges, each side edge disposed on either side of the base edge and each side edge configured to engage with the elevation, wherein the base edge, which faces an opposite edge of the elevation, is parallel to the rotational axis of the closing cap and the housing,
wherein, when screwing in the closing cap, the elevation on the housing snaps into the corresponding recess on the closing cap, wherein the snap-fit connection is formed by the elevation and the recess, and wherein the snap-fit connection is formed such that a distance of about 50 μm exists between the elevation and the corresponding recess upon snapping in,
wherein the closing cap and/or the housing are configured to be elastically deformed when being screwed together and to return to an original shape upon snapping in.

2. Handpiece head according to claim 1, wherein, if the closing cap is screwed into the housing, an outer surface of the closing cap comprises at least one recess, wherein an inner surface of the housing comprises at least one elevation, wherein, when screwing in the closing cap, the elevation on the housing engages in the corresponding recess on the closing cap.

3. Handpiece head according to claim 1, wherein, in a sectional view through the rotational axis of the closing cap and the housing, the elevation and the corresponding recess is formed in the shape of a rectangle.

4. Handpiece head according to claim 1, wherein the elevation comprises a first chamfer on an upper corner and/or a second chamfer on a lower corner.

5. Handpiece head according to claim 1, wherein the recess comprises a chamfer on a lower corner.

6. Handpiece head according to claim 1, wherein the recess is configured as an annular uninterrupted groove on a cylindrical outer surface of the closing cap or on a cylindrical inner surface of the housing.

7. Handpiece head according to claim 1, wherein the elevation is configured as an uninterrupted annular elevation on a cylindrical outer surface of the closing cap or on a cylindrical inner surface of the housing.

8. Handpiece head according to claim 1, wherein the at least one elevation is designed as a ring of a plurality of interrupted elevations, which are disposed on the closing cap or on the housing.

9. Handpiece head according to claim 1, wherein a difference between a first distance from an edge of the elevation to a corresponding edge of the recess in an elastically deformed state and a second distance from the edge of the elevation to the corresponding edge of the recess in a relaxed original state is a fixed value, and wherein the value of the difference is between 3 μm and 10 μm.

10. Handpiece head according to claim 1, wherein the handpiece head has a plurality of openings disposed on the housing and/or the closing cap, such that said plurality of openings facilitate the elastic deformation that occurs when said housing and closing cap are screwed together, by reducing a torque required to screw on the closing cap.

11. Handpiece head according to claim 10, wherein, in the engaged state, the plurality of openings are disposed parallel to the rotational axis of the housing and the closing cap.

12. Handpiece head according to claim 10, wherein one elevation or one recess is respectively disposed between adjacent openings of the plurality of openings.

* * * * *